United States Patent
Saito et al.

(10) Patent No.: US 8,619,864 B2
(45) Date of Patent: Dec. 31, 2013

(54) TRANSCODING/ENCODING WITH CODE AMOUNT ADJUSTMENT AND STUFFING BITS

(75) Inventors: Makoto Saito, Osaka (JP); Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 974 days.

(21) Appl. No.: 12/367,658

(22) Filed: Feb. 9, 2009

(65) Prior Publication Data

US 2009/0225825 A1 Sep. 10, 2009

(30) Foreign Application Priority Data

Mar. 5, 2008 (JP) .................................. 2008-054880

(51) Int. Cl.
*H04N 7/12* (2006.01)
*H04N 11/02* (2006.01)

(52) U.S. Cl.
USPC ................................ 375/240.23; 375/240.03

(58) Field of Classification Search
USPC ........................................ 375/240.23, 240.03
See application file for complete search history.

(56) References Cited

U.S. PATENT DOCUMENTS

| 6,532,262 B1 * | 3/2003 | Fukuda et al. ............ 375/240.03 |
| 2002/0114397 A1 * | 8/2002 | Todo et al. ............... 375/240.29 |
| 2008/0056383 A1 * | 3/2008 | Ueki et al. ................ 375/240.26 |

FOREIGN PATENT DOCUMENTS

| JP | 8-65683 | 3/1996 |
| JP | 10-191331 | 7/1998 |
| JP | 2000-32449 | 1/2000 |
| JP | 2001-169281 | 6/2001 |

* cited by examiner

*Primary Examiner* — Richard Torrente
(74) *Attorney, Agent, or Firm* — Oblon, Spivak, McClelland, Maier & Neustadt, L.L.P.

(57) ABSTRACT

A reference differential value calculation part calculates a reference differential value by subtracting an accumulated value of the target amounts of codes from an accumulated value of the amounts of generated codes from the first period to the (n−1) period. A comparison part compares a cumulative differential value obtained by subtracting the cumulative amount of generated codes from the cumulative target amount of codes of the first to m-th picture frames in the n period with the reference differential value. If the cumulative differential value is larger than the reference differential value, stuffing bits are added to the m-th picture frame to be processed by the amount of codes obtained by subtracting the reference differential value from the cumulative differential value.

8 Claims, 5 Drawing Sheets

TRANSCODING/ENCODING WITH CODE AMOUNT ADJUSTMENT AND STUFFING BITS

BACKGROUND OF THE INVENTION

1. Field of the Invention

The present invention relates to an encoder for encoding an image in a transcoder or the like, and more particularly to a technique to average the amount of generated codes outputted from the encoder.

2. Description of the Background Art

Images to be delivered on digital broadcasts, those to be stored in media such as DVDs and hard disks, and the like are compressed by an encoder in accordance with various coding systems. The object for such compressions is to avoid constraint on a transmission band, increase the transmission speed, decrease the memory size, or the like.

There are various standards for image coding system, such as MPEG2 and H.264. And there is a case where the coding system is converted for the purpose of reducing the amount of codes of a coded image that is inputted, or the like. A transcoder (or a translator) once decodes the inputted coded image. Then, the transcoder codes the decoded image in a different coding system (or the same coding system) again. Thus, the transcoder controls a bit rate of an output stream.

The encoder performs stuffing to average the amount of generated codes of an output stream in a unit time. If the amount of generated codes is smaller than the target amount of codes, the encoder adds dummy data, i.e., stuffing bits, in order to adjust the amount of codes of the output stream.

Specifically, since the target bit rate of the whole output stream is set by a user, the target amount of codes in a unit of GOP (Group Of Pictures) can be calculated. Then, the amount of generated codes of an output stream in a unit of GOP is acquired, the difference between the target amount of codes and the amount of generated codes is obtained by the unit of GOP and the shortage in the amount of codes is supplemented by the stuffing bits.

In Japanese Patent Application Laid Open Gazette No. 10-191331, addition of the stuffing bits is performed by the unit of two GOPs to average the amount of generated codes of an output stream.

In Japanese Patent Application Laid Open Gazette No. 2000-32449, the amount of generated codes in a unit of GOP is counted, and if the count value is smaller than the target amount of codes, stuffing is performed, or if the count value is larger than the target amount of codes, the non-zero coefficient that is the higher order of the DCT coefficient is substituted with "0".

As discussed above, conventionally, stuffing is performed to average the bit rate of an output stream. Since stuffing is performed by the unit of GOP, however, there arises some delay in the transcoding operation for the next GOP. In other words, the operation can not be performed in real time, and this causes some delay between an input stream and an output stream in a transcoder.

There is another case where stuffing bits are added since the amount of generated codes is smaller than the target amount of codes in a specified GOP but the amount of generated codes is larger than the target amount of codes in the other GOPs. In this case, there is a possibility that the bit rate of the whole output stream may exceed the target bit rate set by the user. If the bit rate of the whole output stream exceeds the target bit rate, there arises some problem, such as the outputted stream can not be recorded in a recording medium.

In Japanese Patent Application Laid Open Gazette No. 2000-32449, some consideration is given in order for the bit rate of the whole output stream not to exceed the target bit rate. If the amount of generated codes is larger than the target amount of codes, however, the high-frequency component of an image is deleted since the non-zero coefficient that is the higher order of the DCT coefficient is substituted with "0". Since dummy data, i.e., the stuffing bits are added in some GOPs and some image information is deleted in the other GOPs, this invention is susceptible to improvement.

SUMMARY OF THE INVENTION

The present invention is intended for an encoder for encoding an input image. According to an aspect of the present invention, the encoder comprises a first relation value calculation part for calculating a first relation value indicating a relation between the target amount of codes and the amount of generated codes of an output stream in a past control unit time, a second relation value calculation part for calculating a second relation value indicating a relation between the target amount of codes and the amount of generated codes of the output stream in a current control unit time, and a code amount adjustment part for adding stuffing bits to a picture frame to be processed in the current control unit time if there is a predetermined relation between the first relation value and the second relation value.

By the present invention, it is possible to average the bit rate of the output stream in a unit of time without causing the situation where the bit rate of the whole output stream exceeds the target bit rate.

According to another aspect of the present invention, the code amount adjustment part adds the amount of codes obtained by subtracting the reference differential value from the cumulative differential value as stuffing bits to the picture frame to be processed in the current control unit time if the cumulative differential value is larger than the reference differential value.

It is thereby possible to suppress excessive addition of the stuffing bits.

According to still another aspect of the present invention, the code amount adjustment part performs stuffing after completing the encoding of the picture frame to be processed without waiting for completion of an encoding operation of the current GOP.

It is thereby possible to perform a real-time processing without causing any delay in the output stream.

Therefore, it is an object of the present invention to provide a technique to average the bit rate of an output stream in a unit of time without causing any delay between the input stream and the output stream, in order for the bit rate of the output stream not to exceed the target bit rate.

These and other objects, features, aspects and advantages of the present invention will become more apparent from the following detailed description of the present invention when taken in conjunction with the accompanying drawings.

DESCRIPTION OF THE PREFERRED EMBODIMENTS

{1. Overall Structure of Transcoder}

Figure 1:
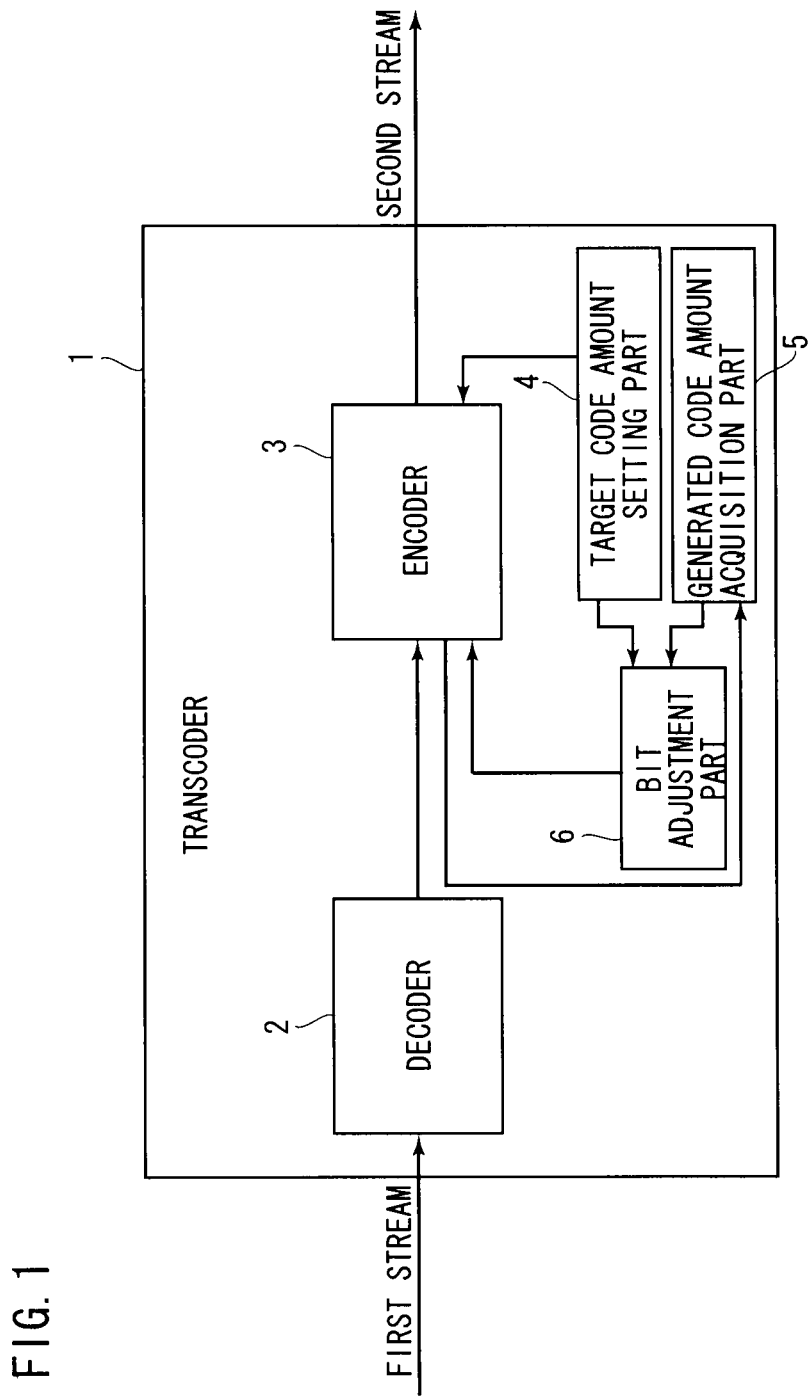
FIG. 1 is a block diagram showing a transcoder in accordance with a preferred embodiment of the present invention.

Hereinafter, the preferred embodiment of the present invention will be discussed, referring to the drawings. FIG. 1 is a block diagram showing a transcoder 1 in accordance with the preferred embodiment. The transcoder 1 comprises a decoder 2 and an encoder 3. The transcoder 1 further comprises a target code amount setting part 4, a generated code amount acquisition part 5 and a bit adjustment part 6.

The decoder 2 inputs a first stream. The first stream is a stream of coded image. The decoder 2 decodes the first stream and outputs uncompressed image data to the encoder 3. The encoder 3 recodes the uncompressed image data which is decoded by the decoder 2 and outputs a second stream.

The transcoder 1 converts a coding system of stream, and for example, inputs a first stream coded in MPEG2 and outputs a second stream coded in H.264. The present invention is devised in order to optimally control the rate of the second stream to be outputted in the conversion. Alternatively, the transcoder 1 outputs a stream of the same coding system, and for example, inputs a first stream coded in MPEG2 and outputs a second stream recoded in MPEG2. Also in this case, the present invention is devised in order to optimally control the rate of the second stream to be outputted.

Though the processing parts 2, 3, 4, 5 and 6 are implemented by hardware in this preferred embodiment of the present invention, the computations of these processing parts 2, 3, 4, 5 and 6 may be implemented by software operations. In other words, these processing parts may be constructed as hardware circuits or implemented by a CPU and programs stored in memories. Alternatively, there may be a case where some of the computations are performed by hardware and the others are performed by software.

{2. Information on Streams}

Figure 2:
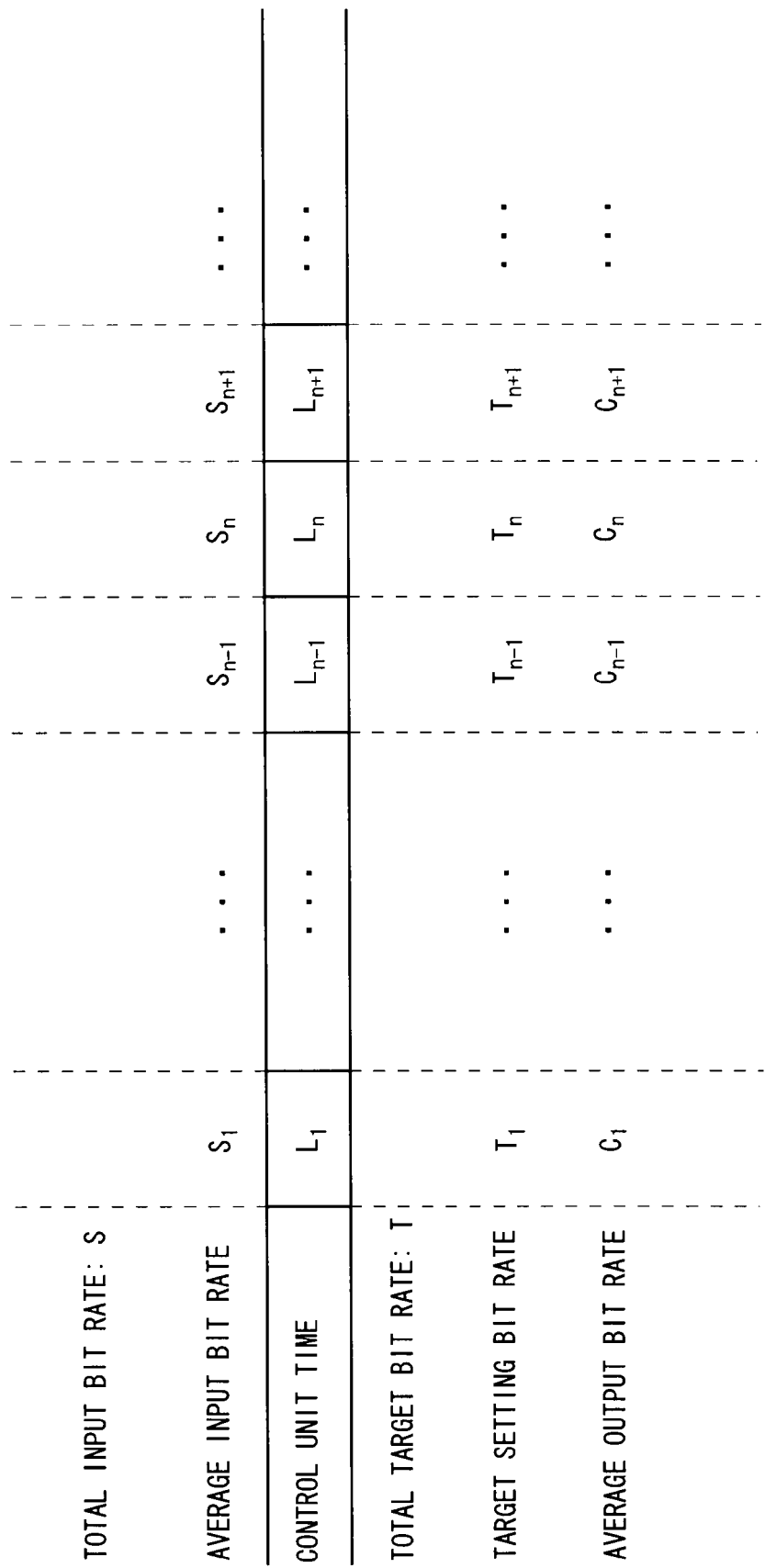
FIG. 2 is a view showing information on streams.

FIG. 2 is a view showing information on streams that the transcoder 1 inputs or outputs, by control unit time. The transcoder 1 divides the processing time base into control unit times $L_n$ (n=1, 2 . . . ) and performs a rate control by using this control unit time $L_n$ as a unit of processing. In the following discussion, the control unit time $L_n$ is referred to as "the n-th period" as appropriate. In the preferred embodiment of the present invention, one GOP is set as the control unit time $L_n$. As the control unit time $L_n$, however, a plurality of GOPs, one frame, a plurality of successive frames, or the like may be set.

A total input bit rate S of the first stream is acquired from a sequence header or the like. An average input bit rate $S_n$ is an average bit rate of the first stream in the n period. The decoder 2 acquires information on the total input bit rate S, the average input bit rate $S_n$, the quantization step value in the n period or the like from the inputted first stream and outputs these information to the encoder 3.

A total target bit rate T of the second stream is set by a user. For example, the user uses a not-shown operation part included in the transcoder 1 to set the total target bit rate T. A target setting bit rate $T_n$ is a target bit rate of the second stream in the n period. An average output bit rate $C_n$ is an average bit rate of the second stream converted in the n period.

The target setting bit rate $T_n$ may be calculated from the total target bit rate T or may be calculated from the information on the first stream, the information on the converted past second stream or the like.

{3. Information on Picture Frames in GOP}

Figure 3:
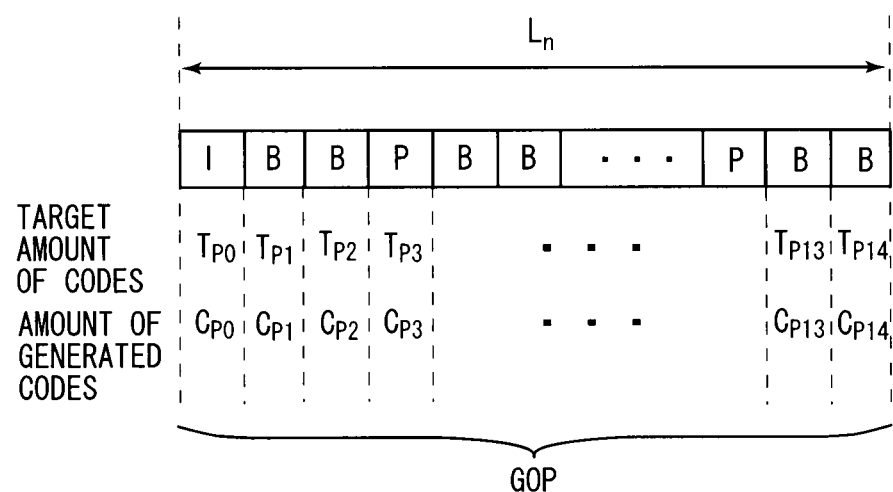
FIG. 3 is a view showing information on picture frames in a GOP.

FIG. 3 is a view showing a constitution of a GOP, the target amount of codes and the amount of generated codes in the n period. As shown in FIG. 3, the GOP consists of a plurality of pictures, i.e., I pictures, B pictures and P pictures. Herein, discussion will be made taking an exemplary case where one GOP consists of 15 picture frames, i.e., "IBBPBBPBBPBBPBB".

With respect to each picture frame in a GOP, the target amount of codes $T_{pk}$ (k=0, 1, 2 . . . 14) can be calculated. Herein, the target code amount setting part 4 calculates the target amount of codes $T_{pk}$ by dividing the target amount of codes $T_{gn}$ in the n period calculated on the basis of the target bit rate $T_n$ in the n period by the number of picture frames (the number of picture frames is 15 herein as discussed above). In other words, in this preferred embodiment, a constant value is adopted as the target amount of codes $T_{pk}$, regardless of the value of k, in the control unit time $L_n$. As the target amount of codes $T_{pk}$, however, any different value, such as a weighted value, may be set for each type of picture. The target code amount setting part 4 gives the calculated target amount of codes $T_{pk}$ to the bit adjustment part 6.

The amount of generated codes $C_{pk}$ (k=0, 1, 2 . . . 14) refers to the amount of codes generated in each picture frame of the second stream on which an encoding operation is actually performed. The generated code amount acquisition part 5 monitors the encoding operation performed by the encoder 3 and acquires the amount of generated codes $C_{pk}$ for each picture frame. Then, the generated code amount acquisition part 5 gives the acquired amount of generated codes $C_{pk}$ to the bit adjustment part 6.

{4. Stuffing Judgment Operation}

Figure 4:
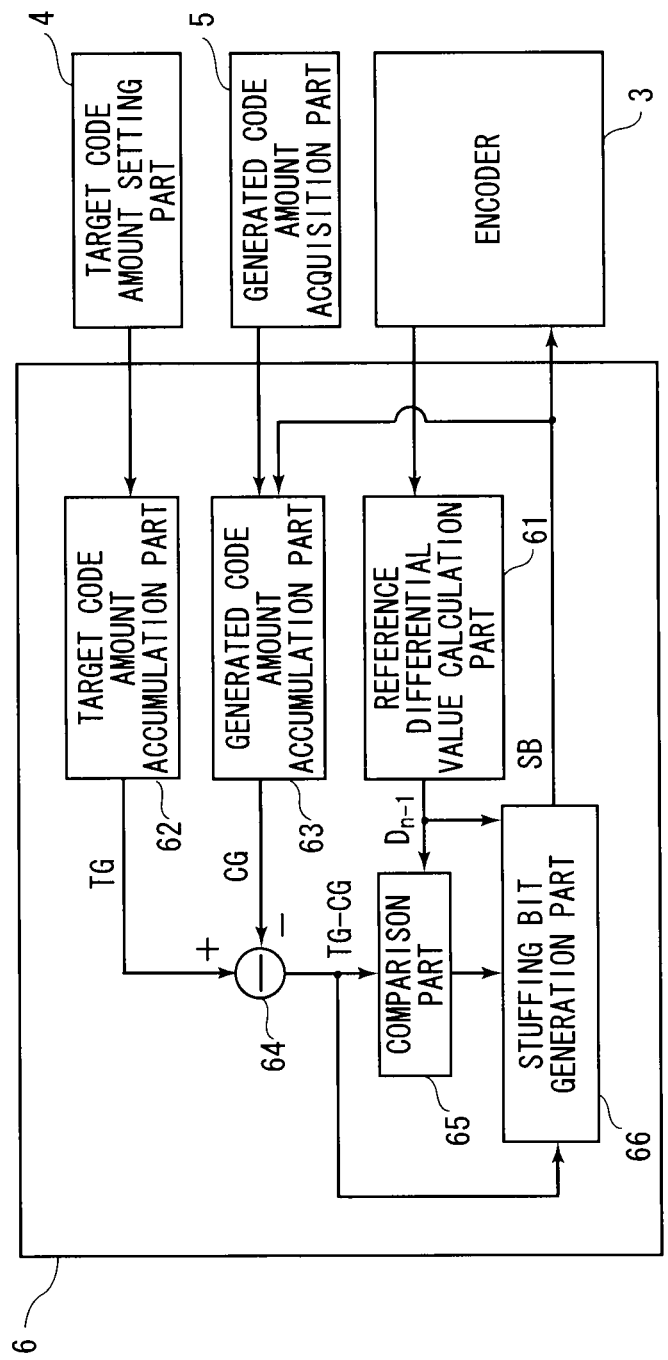
FIG. 4 is a block diagram showing a bit adjustment part.
Figure 5:
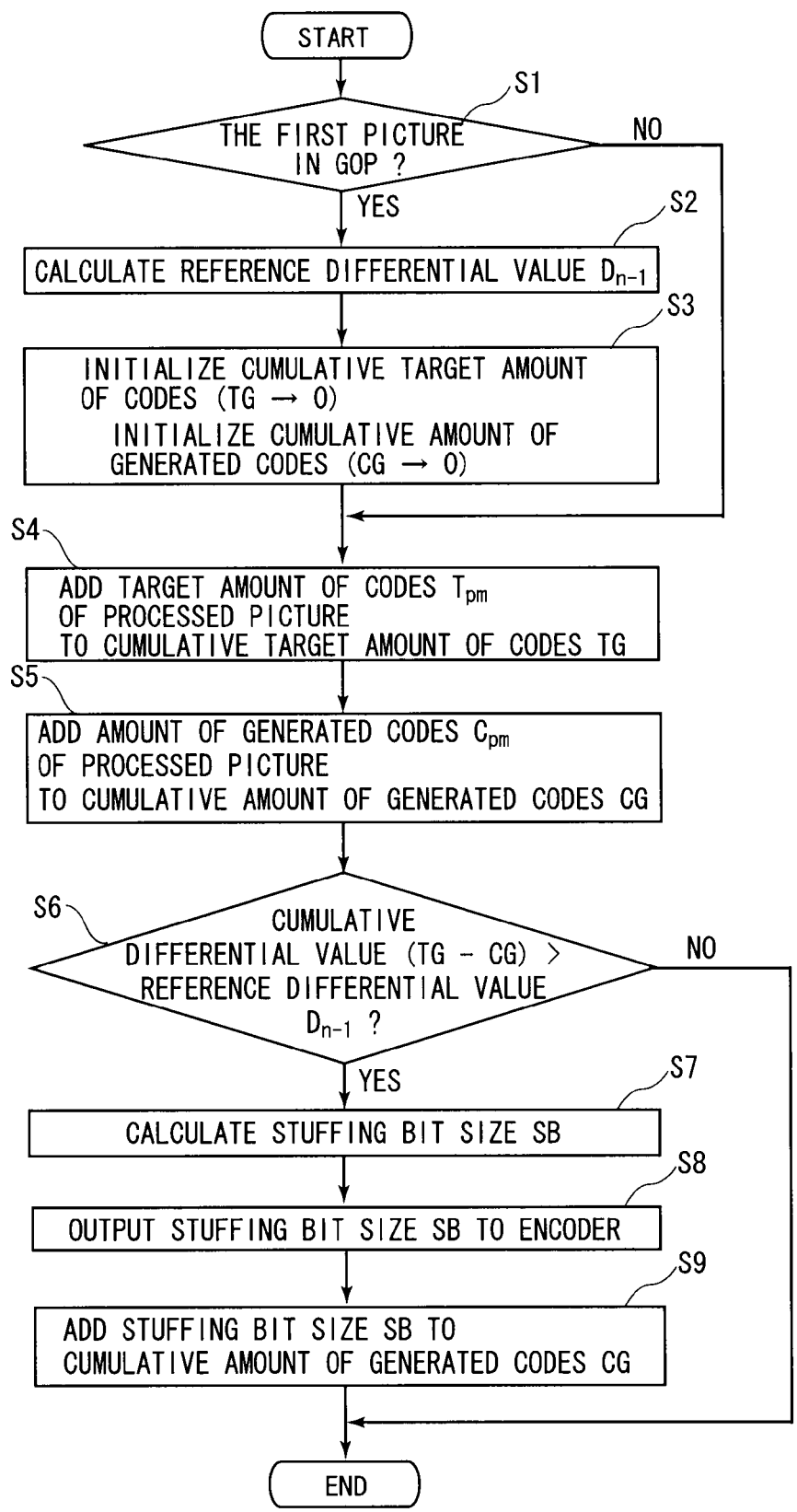
FIG. 5 is a flowchart showing a stuffing judgment operation.

Next, with reference to FIGS. 4 and 5, discussion will be made on a stuffing judgment operation in this preferred embodiment. FIG. 4 is a block diagram showing the bit adjustment part 6. FIG. 5 is a flowchart showing an operation performed by the bit adjustment part 6.

As shown in FIG. 4, the bit adjustment part 6 comprises a reference differential value calculation part 61, a target code amount accumulation part 62, a generated code amount accumulation part 63, a subtracter 64, a comparison part 65 and a stuffing bit generation part 66. The flowchart of FIG. 5 shows an operation performed by the bit adjustment part 6 on the m-th picture frame of the GOP in the n period.

The bit adjustment part 6 first judges whether the picture frame to be processed is the first picture frame in the GOP or not (Step S1). Since the operation shown in the flowchart of FIG. 5 is performed on a picture frame on which the encoding operation is completed by the encoder 3, the picture frame to be processed refers to a picture frame immediately after completion of the encoding operation. Exactly, the picture frame to be processed refers to a picture frame to be subjected to the stuffing judgment operation, after completion of the encoding operation performed by the encoder 3.

If the bit adjustment part 6 judges that the picture frame to be processed is the first picture frame in the GOP ("Yes" in Step S1), the reference differential value calculation part 61 calculates a reference differential value $D_{n-1}$ (Step S2). The reference differential value $D_{n-1}$ refers to a value obtained by subtracting an accumulated value of the target amounts of codes from an accumulated value of the amounts of generated codes from the first GOP (the GOP in the first period) to the GOP in the (n−1) period. In other words, the reference differential value $D_{n-1}$ refers to a value obtained by subtracting the whole target amount of codes from the whole amount of generated codes from the first GOP to the previous GOP. The reference differential value $D_{n-1}$ is expressed by Eq. 1.

$$D_{n-1} = \sum_{1}^{n-1} C_{gl} - \sum_{1}^{n-1} T_{gl} \qquad \text{(Eq. 1)}$$

The reference differential value calculation part 61 calculates the reference differential value $D_{n-1}$ by acquiring the amounts of generated codes $C_{g1}$ to $C_{gn-1}$ and the target amounts of codes $T_{g1}$ to $T_{gn-1}$ from the first period to the (n−1) period, which are stored in a not shown buffer. Thus, in this preferred embodiment, the condition of the amount of generated codes of the past is considered in the stuffing judgment operation in the n period.

After calculation of the reference differential value $D_{n-1}$, the target code amount accumulation part 62 initializes the cumulative target amount of codes TG and the generated code amount accumulation part 63 initializes the cumulative amount of generated codes CG (Step S3).

The cumulative target amount of codes TG is expressed by Eq. 2. The cumulative target amount of codes TG is the accumulated target amount of codes in the GOP. Specifically, the cumulative target amount of codes TG is an accumulated value of the target amounts of codes $T_{pk}$ from the first picture frame to the picture frame (the m-th picture frame) to be currently processed in the GOP of the n period.

$$TG = \sum_{0}^{m} T_{pk} \qquad \text{(Eq. 2)}$$

As discussed above, since a constant value is adopted as the target amount of codes $T_{pk}$ in this preferred embodiment, the cumulative target amount of codes TG is a value obtained by multiplying a value which is obtained by dividing the target amount of codes $T_{gn}$ by the number of picture frames (15) by the number of picture frames (m+1).

The cumulative amount of generated codes CG is expressed by Eq. 3. The cumulative amount of generated codes CG is the accumulated amount of generated codes in the GOP. Specifically, the cumulative amount of generated codes CG is an accumulated value of the amounts of generated codes $C_{pk}$ from the first picture frame to the picture frame (the m-th picture frame) to be currently processed in the GOP of the n period.

$$CG = \sum_{0}^{m} C_{pk} \qquad \text{(Eq. 3)}$$

In Step S3, the cumulative target amount of codes TG and the cumulative amount of generated codes CG are initialized to 0. Thus, at the timing of changing the GOP, first, the cumulative target amount of codes TG and the cumulative amount of generated codes CG are initialized.

On the other hand, in Step S1, if it is not judged that the picture frame to be processed is the first picture frame in the GOP ("No" in Step S1), the process goes to Step S4.

Subsequently, the target code amount accumulation part 62 adds the target amount of codes $T_{pm}$ of the picture frame to be processed (the encoded picture frame) to the cumulative target amount of codes TG (Step S4). With this process, the target amount of codes $T_{pk}$ are accumulated from the first picture frame to the m-th picture frame to be processed in the GOP.

Subsequently, the generated code amount accumulation part 63 adds the amount of generated codes $C_{pm}$ of the picture frame to be processed (the encoded picture frame) to the cumulative amount of generated codes CG (Step S5). With this process, the amount of generated codes $C_{pk}$ are accumulated from the first picture frame to the m-th picture frame to be processed in the GOP.

Next, the subtracter 64 subtracts the cumulative amount of generated codes CG from the cumulative target amount of codes TG, and the comparison part 65 compares the value (cumulative differential value) obtained by subtraction performed by the subtracter 64 with the reference differential value $D_{n-1}$ (Step S6). Eq. 4 expresses the comparison operation performed by the comparison part 65.

$$TG - CG > D_{n-1} \qquad \text{(Eq. 4)}$$

If the value (TG−CG) obtained by subtraction performed by the subtracter 64 is larger than the reference differential value $D_{n-1}$ ("Yes" in Step S6), in other words, if Eq. 4 is satisfied, the comparison part 65 outputs a signal indicating that the stuffing is enabled to the stuffing bit generation part 66. In response to the signal, the stuffing bit generation part 66 performs the operation expressed by Eq. 5, to calculate a stuffing bit size SB (Step S7). Then, the stuffing bit generation part 66 outputs the stuffing bit size SB to the encoder 3 (Step S8).

$$SB = TG - CG - D_{n-1} \qquad \text{(Eq. 5)}$$

Receiving the stuffing bit size SB, the encoder 3 adds stuffing bits to the picture frame to be processed by the stuffing bit size SB.

Thus, in this preferred embodiment, judgment on the amount of codes is performed and stuffing is performed by the unit of picture frame. Then, since judgment is made on whether to perform the stuffing in consideration of not only the amount of generated codes in the current GOP (the GOP in the n period) but also the amount of generated codes in the past GOPs (the GOPs from the first period to the (n−1) period) in judgment on the amount of codes, it is possible to perform control in order for the amount of generated codes of the whole stream not to exceed the target bit rate T.

If the amount of generated codes in the n period is smaller than the target amount of codes and Eq. 4 is satisfied, for example, stuffing is performed. There is an exemplary case where the amount of generated codes in the n period is smaller than the target amount of codes in the n period and the amount of generated codes from the first period to the (n−1) period is also smaller than the target amount of codes in the same periods. There is another exemplary case where the amount of generated codes from the first period to the (n−1) period is larger than the target amount of codes in the same periods but the shortage of the amount of generated codes with respect to the target amount of codes in the n period is larger than the excess of the amount of generated codes with respect to the target amount of codes from the first period to the (n−1) period.

On the other hand, if the amount of generated codes in the n period is smaller than the target amount of codes but the amount of generated codes from the first period to the (n−1) period is larger than the target amount of codes in the same periods and Eq. 4 is not satisfied, stuffing is not performed. There is an exemplary case where the amount of generated codes from the first period to the (n−1) period is larger than the target amount of codes in the same periods and the shortage of the amount of generated codes with respect to the target amount of codes in the n period is smaller than the excess of the amount of generated codes with respect to the target amount of codes from the first period to the (n−1) period.

Even if the amount of generated codes in n period is smaller than the target amount of codes and Eq. 4 is satisfied, stuffing is not simply performed with the shortage in the amount of codes but the stuffing bit size SB is determined in consideration of the amount of codes from the first period to the (n−1) period. In other words, as shown in Eq. 5, since stuffing is performed only with the amount of codes obtained by subtracting the reference differential value $D_{n-1}$ from the cumulative differential value (TG−CG), it is possible to avoid excessive stuffing for the output stream on the whole.

With reference to the flowchart of FIG. 5 again, the stuffing bit generation part 66 also outputs the stuffing bit size SB to the generated code amount accumulation part 63. The generated code amount accumulation part 63 adds the stuffing bit size SB to the cumulative amount of generated codes CG (Step S9). Eq. 6 expresses the operation of Step S9.

$$C'G = CG + SB \quad (\text{Eq.6})$$

In Eq. 6, C'G represents the cumulative amount of generated codes after the stuffing and CG represents the cumulative amount of generated codes before the stuffing. Thus, by adding the stuffing bit size SB to the cumulative amount of generated codes CG, it is possible to judge excess and shortage in the amount of codes for each picture frame in detail and perform an appropriate rate control.

On the other hand, if Eq. 4 is not satisfied in Step S6, in other words, if the value (TG−CG) obtained by the subtracter 64 is not larger than the reference differential value $D_{n-1}$, stuffing is not performed and Steps S7, S8 and S9 are skipped.

When the stuffing is finished on the picture frame to be processed, the bit adjustment part 6 finishes the stuffing judgment operation on the picture frame to be processed. At the point of time when the encoding of the next picture frame is completed, the bit adjustment part 6 performs the stuffing judgment operation shown in FIG. 5 on the next picture frame again. At that time, since Step S3 is skipped in the same GOP, the cumulative target amount of codes TG and the cumulative amount of generated codes CG are accumulated during the GOP. Then, the cumulative amount of generated codes CG to which the stuffing bit size SB is added is accumulated as shown in Eq. 6. This avoids excessive stuffing.

As discussed above, the encoder 3 of this preferred embodiment avoids the case where the bit rate of the second stream may excess the target bit rate T and makes it possible to average the bit rate in the control unit time $L_n$. This avoids the problem that the outputted stream can not be recorded in a recording medium.

Further, the encoder 3 performs the stuffing judgment operation every time when the encoding of the picture frame is completed and performs the stuffing as necessary. The operation on this stuffing can be performed concurrently with the encoding of the next picture frame. Therefore, without causing any delay due to the stuffing, it is possible to output the second stream in real time.

While the invention has been shown and described in detail, the foregoing description is in all aspects illustrative and not restrictive. It is therefore understood that numerous modifications and variations can be devised without departing from the scope of the invention.

What is claimed is:

1. An encoder for encoding an input image, comprising:
a first relation value calculator that calculates a first relation value indicating a relation between a target amount of codes and an amount of generated codes of an output stream in a past control unit time;
a second relation value calculator that calculates a second relation value indicating a relation between a target amount of codes and an amount of generated codes of said output stream in a current control unit time after a coding process to a picture frame of the current control unit time is finished; and
a code amount adjuster that adds stuffing bits to said picture frame after the coding process to the picture frame in said current control unit time is finished if there is a predetermined relation between said first relation value and said second relation value,
wherein said first relation value calculator calculates
a first cumulative target amount of codes by accumulating the target amount of codes of said output stream from a first control unit time to a previous control unit time,
a first cumulative amount of generated codes by accumulating the amount of generated codes of said output stream from the first control unit time to the previous control unit time, and
the relation between said first cumulative target amount of codes and said first cumulative amount of generated codes as said first relation value, and
wherein said second relation value calculator calculates
a second cumulative target amount of codes by accumulating the target amount of codes of said output stream by a unit of picture frame from a first picture frame to the picture frame to be processed in said current control unit time,
a second cumulative amount of generated codes by accumulating the amount of generated codes of said output stream by the unit of picture frame from the first picture frame to the picture frame to be processed in said current control unit time and
the relation between said second cumulative target amount of codes and said second cumulative amount of generated codes as said second relation value.

2. The encoder according to claim 1, wherein
said first relation value includes a reference differential value calculated by subtracting said first cumulative target amount of codes from said first cumulative amount of generated codes,
said second relation value includes a cumulative differential value calculated by subtracting said second cumulative amount of generated codes from said second cumulative target amount of codes, and
said code amount adjuster adds stuffing bits to said picture frame to be processed in said current control unit time when said cumulative differential value is larger than said reference differential value.

3. The encoder according to claim 2, wherein said code amount adjuster adds the amount of codes obtained by subtracting said reference differential value from said cumulative differential value as stuffing bits to said picture frame to be processed in said current control unit time when said cumulative differential value is larger than said reference differential value.

4. The encoder according to claim 2, wherein said second relation value calculator adds the amount of codes obtained by subtracting said reference differential value from said cumulative differential value to said second cumulative amount of generated codes when said cumulative differential value is larger than said reference differential value.

5. The encoder according to claim 1, wherein said past control unit time and said current control unit time include one Group of Pictures (GOP) period.

6. The encoder according to claim 5, wherein said code amount adjuster performs stuffing after completing encoding of said picture frame to be processed without waiting for completion of an encoding operation of a current GOP.

7. A transcoder, comprising:
   a decoder that decodes a first stream; and
   an encoder that encodes uncompressed image data outputted from said decoder,
   wherein said encoder includes
      a first relation value calculator that calculates a first relation value indicating a relation between a target amount of codes and an amount of generated codes of an output stream in a past control unit time;
      a second relation value calculator that calculates a second relation value indicating a relation between a target amount of codes and an amount of generated codes of said output stream in a current control unit time after a coding process to a picture frame of the current control unit time is finished; and
      a code amount adjuster that adds stuffing bits to said picture frame after the coding process to the picture frame in said current control unit time is finished if there is a predetermined relation between said first relation value and said second relation value,
   wherein said first relation value calculator calculates
      a first cumulative target amount of codes by accumulating the target amount of codes of said output stream from a first control unit time to a previous control unit time,
      a first cumulative amount of generated codes by accumulating the amount of generated codes of said output stream from the first control unit time to the previous control unit time, and
      the relation between said first cumulative target amount of codes and said first cumulative amount of generated codes as said first relation value, and wherein said second relation value calculator calculates
      a second cumulative target amount of codes by accumulating the target amount of codes of said output stream by a unit of picture frame from a first picture frame to the picture frame to be processed in said current control unit time,
      a second cumulative amount of generated codes by accumulating the amount of generated codes of said output stream by the unit of picture frame from the first picture frame to the picture frame to be processed in said current control unit time, and
      the relation between said second cumulative target amount of codes and said second cumulative amount of generated codes as said second relation value.

8. A method, implemented by an encoder, for encoding an input image, comprising:
   calculating a first relation value indicating a relation between a target amount of codes and an amount of generated codes of an output stream in a past control unit time;
   calculating a second relation value indicating a relation between a target amount of codes and an amount of generated codes of said output stream in a current control unit time after a coding process to a picture frame of the current control unit time is finished; and
   adding, via a processor, stuffing bits to said picture frame after the coding process to the picture frame in said current control unit time is finished if there is a predetermined relation between said first relation value and said second relation value,
   wherein the calculating of the first relation value includes calculating
      a first cumulative target amount of codes by accumulating the target amount of codes of said output stream from a first control unit time to a previous control unit time,
      a first cumulative amount of generated codes by accumulating the amount of generated codes of said output stream from the first control unit time to the previous control unit time, and
      the relation between said first cumulative target amount of codes and said first cumulative amount of generated codes as said first relation value, and wherein the calculating of the second relation value includes calculating
      a second cumulative target amount of codes by accumulating the target amount of codes of said output stream by a unit of picture frame from a first picture frame to the picture frame to be processed in said current control unit time,
      a second cumulative amount of generated codes by accumulating the amount of generated codes of said output stream by the unit of picture frame from the first picture frame to the picture frame to be processed in said current control unit time, and
      the relation between said second cumulative target amount of codes and said second cumulative amount of generated codes as said second relation value.

* * * * *